A. V. CAUGER.
LANTERN SLIDE.
APPLICATION FILED JUNE 11, 1912.
1,142,143.
Patented June 8, 1915.
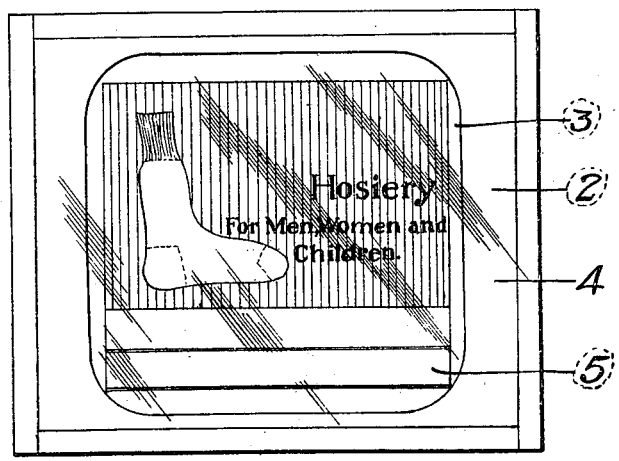
Fig. I.
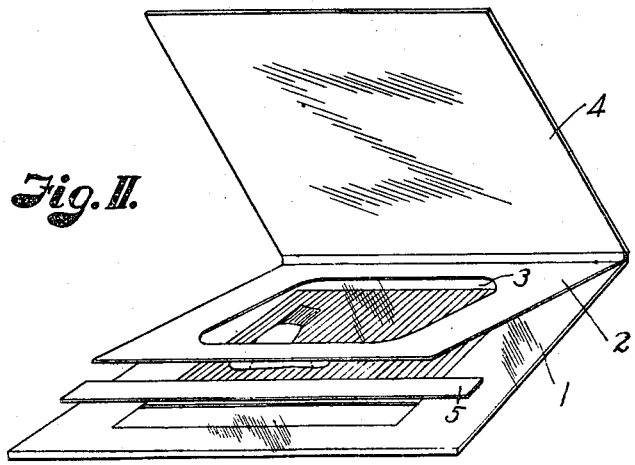
Fig. II.
WITNESSES:
Arthur W. Caps.
Lewis L. Miller
INVENTOR
A. V. Cauger.
BY
Arthur C. Brown
ATTORNEY

UNITED STATES PATENT OFFICE.

ARTHUR V. CAUGER, OF KANSAS CITY, MISSOURI.

LANTERN-SLIDE.

1,142,143.  Specification of Letters Patent.  Patented June 8, 1915.

Application filed June 11, 1912. Serial No. 703,092.

*To all whom it may concern:*

Be it known that I, ARTHUR V. CAUGER, a citizen of the United States, residing at Kansas City, in the county of Jackson and State of Missouri, have invented certain new and useful Improvements in Lantern-Slides; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in lantern slides, and more particularly to a class of slides used for advertising purposes wherein a number of slides bearing the same general subject matter are made for or by a firm using this class of advertising, and wherein the names of local dealers are applied to the slides so that they can be used for advertising the business of the local dealer and of the principal firm.

Owing to the construction of the slide and the material used therein, it is difficult and sometimes impossible to remove the name of a dealer from the slide so that the latter can be used for or by a different dealer.

It is the object of the present invention to provide a slide of the character described wherein a name plate may be easily and quickly applied to the slide or removed therefrom, thereby enabling the manufacturer to purchase or make a number of slides bearing the same general subject matter, apply the dealer's name thereto so that the slide may be used locally, and afterward change the name of the dealer so that the slide may be used in a different locality when desired.

In accomplishing this object, I have provided the improved details of structure hereinafter described and illustrated in the accompanying drawings wherein:

Figure I is a plan view of a slide constructed according to my invention. Fig. II is a perspective view of a slide, showing the various parts in spaced relation.

Referring more in detail to the parts: 1 designates the picture plate of the slide, upon which the matter to be shown on a screen is carried, the picture being printed on or applied to the inner face of the back, by a photograph, or other process. A mat 2 covers the ends of the back and exposes the picture through the sight opening 3, the mat in turn being overlaid by a transparent front or protecting plate 4.

In following out my invention, I provide an insert or slip 5, bearing the name of a dealer and preferably composed of celluloid, gelatin, or other transparent or translucent flexible material, which may be applied to the back in suitable relation to the picture, in ordinary practice, the ends of the slip or insert being secured to the gelatin coating of the back before the slide is assembled. When the slide is assembled, the edges of the front and back plates are bound together, preferably by adhesive tape, so that the mat and insert are held firmly in place. The slide is then used in the ordinary way, the light passing through the celluloid or gelatin insert, as well as through the photograph on the back of the slide, so that when the picture is projected the name appears as part of the picture, the edges of the insert not being disclosed. Should it be desired to change the name of the local dealer, the adhesive tape may be removed to enable the parts of the slide to be separated, the insert removed from the back of the slide and a new insert applied so that the slide can be used under a different name or in a different locality.

While I have described my slide as applied to advertising purposes, it is apparent that the invention is not wholly limited to such use and that the insert may bear other information or part of the picture without departing from the spirit of my invention.

Having thus described my invention, what I claim as new therein and desire to secure by Letters-Patent, is:

1. A lantern slide comprising a back plate having matter thereon adapted for projection, a clear, transparent plate overlying said back plate, a mat having an opening therein located between said plates and surrounding the projectable matter on said back plate, an insert located between said mat and back plate and in line with the opening in the mat, and means for binding the plates together.

2. A lantern slide comprising a plate having matter thereon adapted for projection, a transparent plate overlying said back plate, a mat located between said plate and surrounding the projectable matter on the first named plate, and an insert located between the mat and the first named plate with its ends fixed to said plate and bearing matter intermediate its ends adapted for projection with the matter on said plate.

In testimony whereof I affix my signature in presence of two witnesses.

ARTHUR V. CAUGER.

Witnesses:
ARTHUR C. BROWN.
LETA E. COATS.